Jan. 29, 1957

H. M. SCARFF 2,779,040

TOOL-CENTERING MACHINE

Filed June 3, 1954

INVENTOR.
HAROLD M. SCARFF
BY
C. G. Stratton
ATTORNEY

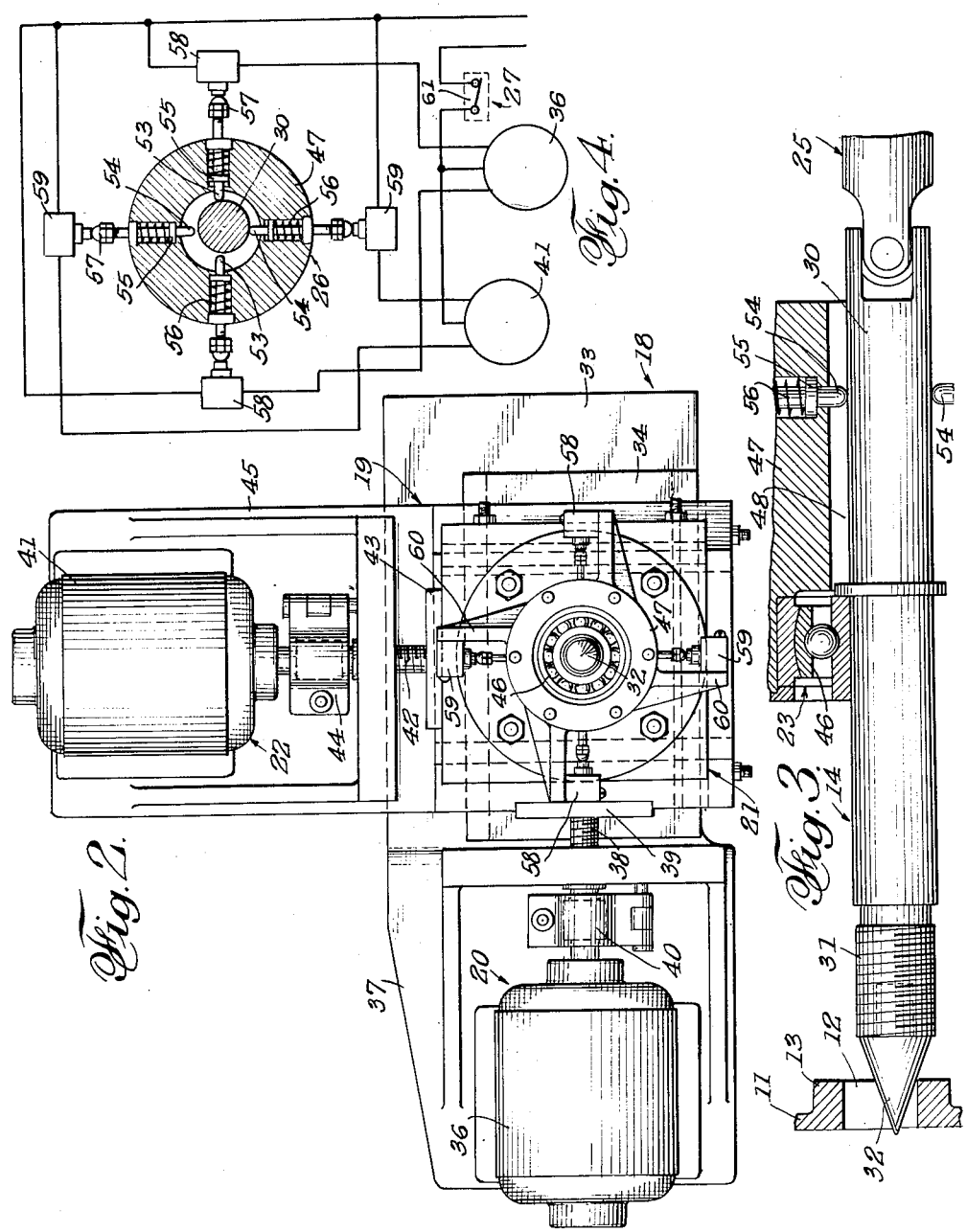

United States Patent Office 2,779,040
Patented Jan. 29, 1957

2,779,040
TOOL-CENTERING MACHINE
Harold M. Scarff, Sherman Oaks, Calif.
Application June 3, 1954, Serial No. 434,160
12 Claims. (Cl. 10—147)

This invention relates to a machine for automatically centering a tool, such as a tap, reamer, countersink, counterbore, etc., on a hole already provided so that the operation performed by such tool may be efficiently carried out.

Particularly in large or bulky articles as, for instance, hot water tanks, certain pipe-threaded holes are provided. The location of such holes is rendered less costly if the locating tolerances are quite broad. However, such general location frequently creates considerable misalignment between a hole drilled or punched and the tip of a tapping head that provides threads for said hole. Also, because of the nature of fabrication of the mentioned articles, close tolerances are difficult to maintain. Since large production depends on the ease and speed of placing an article so that a hole thereof may be tapped at low cost regardless of substantial displacement of said hole with respect to a normal or ideal location, it is an object of the present invention to provide a tool-centering machine that responds to a pilot provided on the tool to center said tool on a hole into which the pilot is entered.

Since tapping is a secondary operation performed on a hole already provided, the tool of such machine may comprise a tap. However, various types of secondary operations may be performed and the tool employed varying according to the operation. When the terms "tap" or "tapping" are used herein, the same are intended to include reamers, countersinks, counterbores, broaches, etc., and the operations performed by such tools. While the present machine is disclosed as rotating the tool that performs the secondary operation, such rotation may be omitted, as when a broach is used.

Another object of the invention is to provide electrically operated means responsive to angular displacement of a tool, to restore the normal longitudinal position of said tool from an axis offset from a hole on which the tool is to perform an operation to an axis in proper alignment with said hole.

A still further object of the invention resides in the provision of compound slides to effect the mentioned shift of the tool from an offset axis with respect to said hole and an axis in alignment.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 2 is a front elevational view thereof with the mounting means shown in Fig. 1 omitted.

Fig. 3 is an enlarged fragmentary detail and sectional view of the tool of said machine.

Fig. 4 is a wiring diagram.

Figure 1:
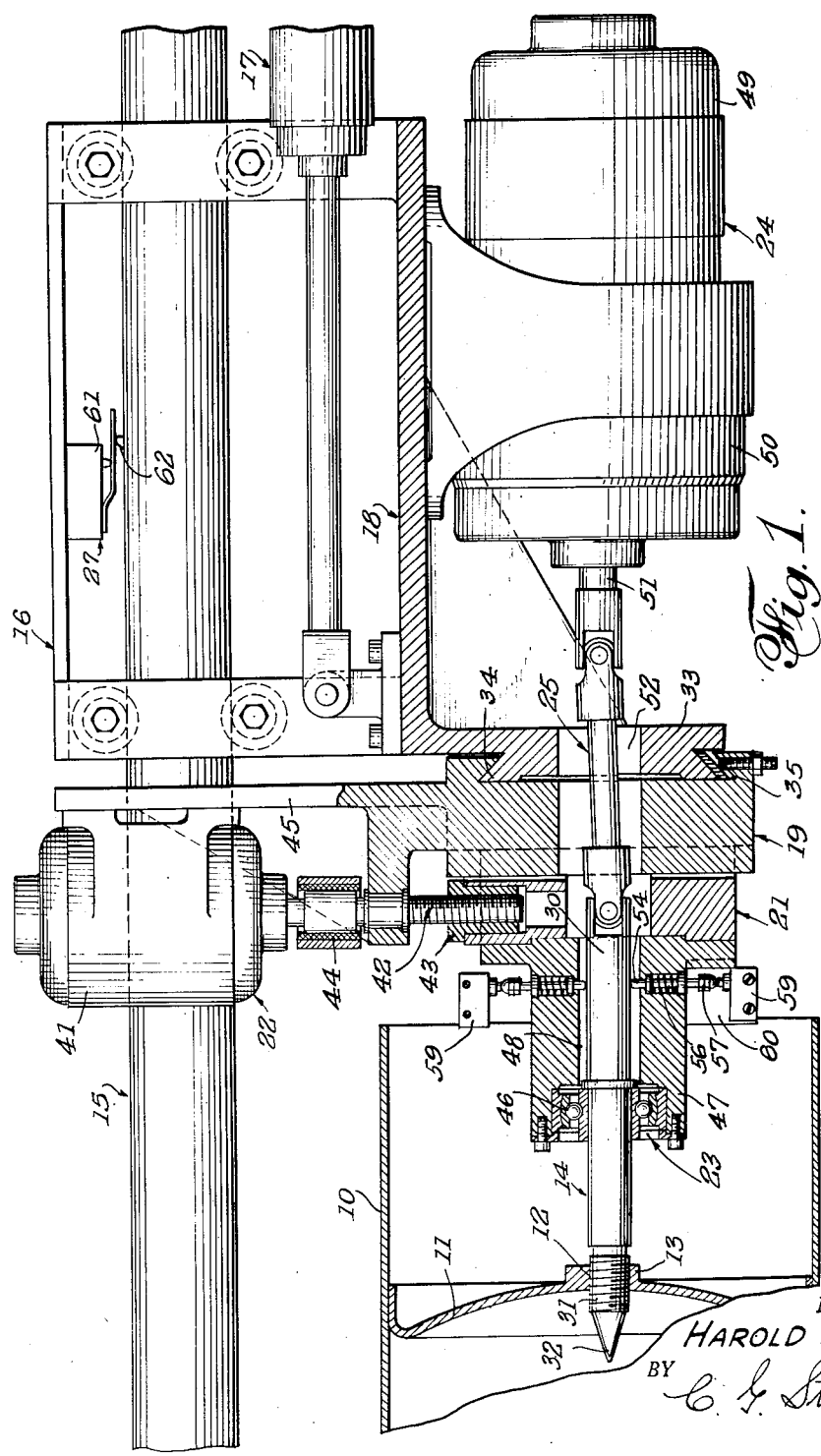
Fig. 1 is a longitudinal sectional view of a tool-centering machine according to the present invention.

In Figs. 1 and 3 of the drawings is shown a tank 10 in which the head 11 is provided with a hole 12. In Fig. 3, said hole is shown as centered on its boss 13 as an indication that the same is centered on the tank 10. In Fig. 1, said hole is shown as displaced from the actual center of the tank, although the displacement of offset is somewhat greater than would ordinarily be the case. While the means for supporting 10 is not shown and forms no part of this invention, in practice, the tank 10 is supported so that its axis is on the normal axis of tool 14.

The machine for centering tool 14 on hole 12, should there be any displacement between the axis of said tool and the center of said hole, comprises, generally, a support 15, carriage means 16 engaged with the support to move therealong, means 17 to move the carriage back and forth along the support, a bracket 18 affixed on the carriage and movable therewith, a slide 19 engaged with said bracket, means 20 to move said slide 19 relative to the bracket, a slide 21, transverse to slide 19, engaged with the latter slide, means 22 to move slide 21 relative to slide 19 and to bracket 18, support means 23, carried by slide 21, and mounting tool 14 for angular movement, means 24 to drive said tool, a flexible universal driving connection 25 between the driving means 24 and tool 14, means 26 operatively associated with the tool and responsive to angular deflection thereof to operate the means 20 and the means 22 either singly or together to so control the slides 19 and 21 as to position the tool on the axis of hole 12, and limit switch means 27 to render the means 20 and 22 inoperative after engagement of said tool with hole 14.

The particular form of support means 15, carriage 16 and carriage-moving means 17 is immaterial to this invention and the same may be varied in many ways providing the bracket 18, affixed to said carriage, is movable toward and from the end of tank 10 or any other article having a hole 12 on which the tool 14 is to perform an operation.

The tool 14 that is illustrated comprises an elongated shank 30 having an operating part 31 and a conical tip 32 extending forwardly from said part. In this case, part 31 is shown as a tap and it is evident that the same may comprise any other form of tool capable of operating on the hole 12. The conical tip 32 has its apex on the axial center of the tool and, consequently, constitutes a pilot that guides the tool into hole 12.

The bracket 18 is provided with a wall 33, in this case vertical, having a dovetailed guide 34.

The slide 19 is provided with a dovetailed way 35 engaged with guide 34. Said guide and way are shown as horizontal. Therefore, slide 19 is movable horizontally relative to bracket 18.

The slide moving means 20 (see Fig. 2) comprises electric reversing motor 36 mounted on a lateral extension 37 of bracket wall 33, a threaded stem 38 driven in one direction or the other by said motor, and a nut 39 affixed to slide 19 in which said stem is engaged. Thus, rotation of stem 38 causes transverse movement of slide 19 relative to bracket wall 33. In practice, a light drag 40 is applied to the motor shaft to act as a brake for said shaft and minimize overrun after deenergization of the motor.

A guide and way interconnection similar to that between bracket wall 33 and slide 19, is provided between the slides 19 and 21 but the same is vertical so as to be transverse to the guide 34 and way 35. Thus, slide 21 is a vertical slide and the motor 41, stem 42, nut 43 affixed to slide 21, and brake or drag 44 of means 22 are directly comparable to the above-described components of means 20, except that motor 41 is carried by an upper extension 45 of slide 19.

The compound movement of the mutually transverse slides 19 and 21 affects the axial position of the tool-supporting means 23. Said means 23 is shown as a self-aligning radial bearing 46 carried at the end of a housing 47 affixed to the face of slide 21 and in which tool shank 30 is mounted. The bearing 46 engages an intermediate part of said tool shank so that said bearing constitutes a fulcrum on which the tool may change its angular disposition relative to the axial bore 48 of housing 47 and into which said shank extends. It will be clear that depression of pilot 32 results in elevation of the inward end of the tool shank, movement to the right of said pilot results in movement to the left of said shank, etc. The self-aligning feature of the bearing 46, or means comparable thereto, is essential. The rotational feature of said bearing is needed only for rotational tools.

The tool 14 is driven, if rotational, by the means 24 which comprises an electric motor 49 provided with suitable speed-reducing gearing 50, if such reduction is necessary, as when a tap is used. This means 24 is preferably carried by the horizontal wall of bracket 18 and has its driven shaft 51 connected to tool 14 by the driving connection 25 which, in this case, is shown as a universal joint. The wall 33 and slides 19 and 21 are provided with suitable through holes 52 to accommodate said driving connection.

The means 26 can best be seen in Fig. 4. Said means comprises a pair of opposed radial feeler pins or plungers 53 and a second pair of opposed feeler pins 54 transverse to feeler pins 53 and both pairs carried by housing 47 so that their inner ends are directed into bore 48. Each pin has a position limiting flange 55 that is urged by a spring 56 to bring its inner end into touching engagement with tool shank 30. The ends of said feeler pins are so proportioned that with tool shank 30 exactly central or axial in bore 48, said feeler pin ends either just touch said tool shank or are just clear thereof. Therefore, the outer ends of all of the feeler pins are normally in a retracted position.

Each pin has an adjustable outer end 57. The outer ends of pins 53 are directed to engage the operating buttons or plungers of switches 58. Similarly, the outer ends of pins 54 are directed to engage the operating plungers of switches 59. Said switches 58 and 59 are carried by bracket extensions 60 of housing 47.

The means 26 further includes electric circuits interconnecting reversing motor 36 with switches 58 and reversing motor 41 with switches 59. One switch 58, when closed, is connected to drive motor 36 in one direction. The other switch 58 is connected to drive said motor in the opposite direction. Switches 59 are similarly connected to drive motor 41 in the opposite direction.

When the conical pilot 32 enters a hole 12 without contacting the sides of said hole, the tool part 31 will perform its operation on said hole without any shift in the positions of slides 19 and 21. However, should the tool and the hole 12 be mis-aligned, as in Fig. 3, then the tool will tilt around the center of bearing 46 and cause the tool shank 30 to outwardly press one of the pins 53 or 54. If the pilot 32 is urged upwardly by the wall of hole 12 the lower pin 54 will be projected by tool shank 30 and cause closing of the lower switch 59. The circuit thus made through motor 41 will operate said motor in a direction to raise slide 21 until balance between the opposed pins 54 is re-established, axial alignment of tool 14 is achieved, and lower switch 59 re-opened. Now, the tool is in axial alignment with hole 12 so that part 31 thereof may enter said hole, as shown in Fig. 1, and properly perform its function.

If, at the same time, said hole is laterally misaligned with tool 14, one of the pins 53 will be projected to cause closing of one switch 58 and operation of motor 36 in a direction to re-establish axial alignment between the tool and hole 12.

While Fig. 4 shows how tilting of tool shank 30 causes actuation of one each of the pairs of switches 58 and 59, the same is shown in somewhat exaggerated form. Actually, depending on the sensitivity of switches 58 and 59, only a slight tilt of tool shank 30 causes one slide or both, as the case may be, to shift as above indicated.

The limit switch means 27 is provided for opening the circuits to motors 36 and 41 after tool part 31 has started operation in hole 12. In this case, said means comprises a normally-closed limit switch 61 carried by carriage 16 and a lug 62 on carriage support 15 and located to open said switch at the proper time. In this manner, assurance is had that the slides will not shift once the tool has entered hole 12.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. In a tool-centering machine, the combination comprising a pair of transverse slides, motor means to move each slide, a tool tiltably carried by one slide and having a conical pilot adapted to enter a hole in a piece of work, a plurality of pins around said tool and responsive to tilt thereof, and a plurality of switches engageable by said pins to operate the slide-moving means and bring the tool into alignment with said hole.

2. In a tool-centering machine according to claim 1: a bracket mounting said slides and movable in a direction to feed the tool into said hole.

3. In a tool-centering machine according to claim 1: a bracket mounting said slides and movable in a direction to feed the tool into said hole, driving means for said tool carried by the bracket, and a universal joint connection between said driving means and tool.

4. In a tool-centering machine according to claim 1: a movable bracket mounting said slides, and limit switch means, controlled by movement of said bracket to render inoperative the slide-moving means when the tool has entered the mentioned hole.

5. A tool-centering machine according to claim 1: a self-aligning radial bearing for rotationally and tiltably carrying said tool by said slide.

6. A tool-centering machine comprising transverse slides, means to move each slide, bearing means on one of said slides to tiltably and rotatably carry a tool, a tool with an elongated shaft tiltably carried by said bearing means and having a conical pilot adapted to enter a hole in a piece of work, means surrounding said tool shaft and responsive to tilt of said tool as the pilot encounters one side of the wall of said hole to operate the slide-moving means to bring the tool into alignment with said hole, the means to move each slide comprising an electric motor having a threaded driven member and a nut engaged by said driven member, and means to move said tool toward and away from said work.

7. A tool-centering machine comprising transverse slides, means to move each slide, bearing means on one of said slides to tiltably and rotatably carry a tool, a tool with an elongated shaft tiltably carried by said bearing means and having a conical pilot adapted to enter a hole in a piece of work, means surrounding said tool shaft and responsive to tilt of said tool as the pilot encounters one side of the wall of said hole to operate the slide-moving means to bring the tool into alignment with said hole, the means to move each slide comprising an electric motor having a threaded driven member and a nut engaged by said driven member, and the means responsive to tilt of the tool comprising spring-biased radially disposed pins lying in a plane perpendicular to the axis of said tool and switch-controlled electric circuits operable by said pins, and means to move said tool toward and away from said work.

8. A tool-centering device comprising means for moving said device toward and away from a piece of work, a tool having a conical pilot and a part rearward of the pilot to operate upon a hole in said piece of work, means for mounting said tool to pivot universally under deflection by engagement of said pilot with the wall of a hole that is offset from the axis of the tool, a slide mounting the tool-mounting means, a cross slide mounting the first slide, an electric reversing motor having a threaded driven member operatively connected to each slide to move the same transverse to the axis of the tool, two pairs of mutually transverse spring-biased pins carried by the first slide and directed radially and in position to be projected by the tool when deflected, said pins lying in a plane perpendicular to the axis of said tool, a switch-controlled electric-circuit operated by one pair of said pins and connected to one of said motors, and a second switch-controlled electric circuit operated by the other pair of said pins and connected to the other of said motors, one pin of each pair being adapted to close a switch of its respective electric circuit to drive its motor in one direction and the other pin of each pair being adapted to close a switch of its respective circuit to drive its motor in the opposite direction.

9. A tool-centering device according to claim 8: a normally-closed switch in the motor circuits, and means to open said switch after the mentioned rearward part of the tool has entered the hole.

10. A tool-centering machine comprising the combination of a pair of transverse slides, motor means to move each slide, bearing means on one of said slides to tiltably and rotatably carry a tool, a tool with an elongated shaft carried in said bearing means, said tool having a conical pilot adapted to enter a hole in a piece of work, a plurality of pins around said tool and in a plane perpendicular thereto, said pins being responsive to any tilt of said shaft, a plurality of switches adapted to be engaged by said pins when said shaft is tilted, said switches being connected to said motor means to bring the tool into alignment with said hole, driving means to drive the tool into the hole, and a universal joint interconnecting said tool and said driving means.

11. A tool centering machine according to claim 10: a bracket mounting said slides and said driving means, and means to move said bracket in a direction to feed the tool into the hole.

12. A tool-centering machine according to claim 10: a bracket mounting said slides and said driving means, means to move said bracket in a direction to feed the tool into the hole, and limit switch means controlled by movement of said bracket to render inoperative the motor means when the tool has entered the hole.

References Cited in the file of this patent
UNITED STATES PATENTS

| | | |
|---|---|---|
| 1,840,853 | Shaw et al. | Jan. 12, 1932 |
| 2,679,620 | Berry | May 25, 1954 |